Dec. 2, 1924.

M. TOCCHIO 1,517,925

GEYSER, KETTLE, WATER HEATER, AND OTHER LIKE RECEPTACLE

Filed April 17, 1924

Inventor.
Michele Tocchio.

Patented Dec. 2, 1924.

1,517,925

UNITED STATES PATENT OFFICE.

MICHELE TOCCHIO, OF LONDON, ENGLAND.

GEYSER, KETTLE, WATER HEATER, AND OTHER LIKE RECEPTACLE.

Application filed April 17, 1924. Serial No. 707,161.

*To all whom it may concern:*

Be it known that I, MICHELE TOCCHIO, an Italian subject, residing at 126 Dalling Road, in the county of London, W. 6, England, have invented new and useful Improvements in Geysers, Kettles, Water Heaters, and other like Receptacles, of which the following is a specification.

This invention relates to certain new and useful improvements in geysers, kettles, water heaters and other analogous receptacles, and has for its object to provide means for giving a very large heating surface area, thereby reducing the consumption of electricity, gas and the like, and simultaneously the time required for boiling water or other liquid.

A further object of my invention is to provide a geyser, kettle, water heater and the like, whereon another cooking utensil may be heated.

In one form of my invention I provide a receptacle having a cross-wise slot cut in the concave base and on the inner side of the latter, I mount a corresponding shaped hollow cross-piece or flue with the upper end extending slightly above the apex of the said receptacle.

A concave cover provided with a cross-wise slot and one or more handles being adapted to fit on the top of the aforesaid receptacle, and the upper end of the flue passes through said slot, and there are two or more apertures in the rim of the cover to allow the gaseous fumes to escape into the atmosphere and when it is not desired to heat a further receptacle, the cover may be enclosed with a lid and the fumes escape as herein set forth.

Figure 1:
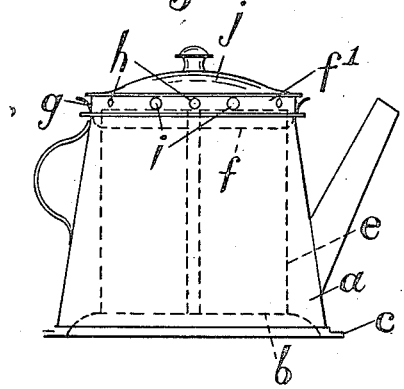
Figure 2:
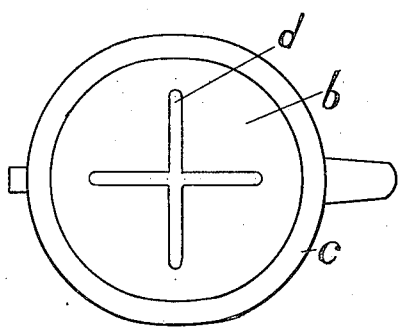
Figure 3:
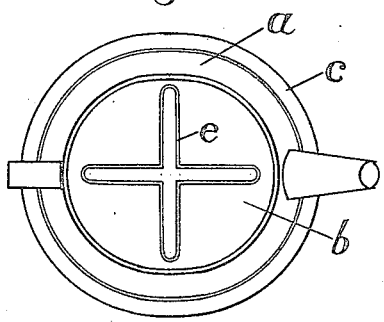
Figure 4:
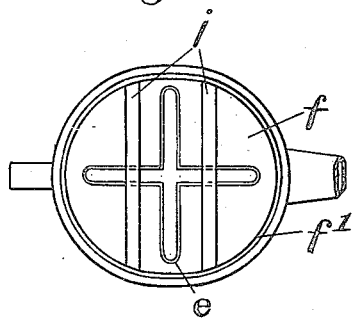

In the accompanying drawings Fig. 1 is a side view of my invention as applied to a kettle; Fig. 2 is a bottom view of the base of Fig. 1; Fig. 3 is a top view with the cover and lid removed; and Fig. 4 is a like view having the cover in position.

In the accompanying drawings I have shewn my invention in the form of a kettle, but I wish it to be understood that it can be adapted to a geyser, water heater, and other analogous receptacles.

My invention comprises a kettle $a$, having a concave shaped base $b$, with a flange $c$, on the periphery as shewn in Fig. 1, and a cross-wise slot $d$, is cut in the said base $b$, as shewn in Fig. 2, and on the inner side I mount a correspondingly shaped hollow cross-piece or flue $e$, by means of solder or if desired may be cast or welded to the base $b$, and the upper end of the flue $e$, extends slightly above the apex of the kettle $a$, as shewn in dotted lines in Fig. 1.

The aforesaid kettle $a$, is closed at the top by a concave cover $f$, with a rim $f^1$, and handles $g$, placed diametrically opposite each other being of any desired shape. Said cover $f$, has a cross-wise slot cut therein for receiving the end of the hollow cross-piece or flue $e$, as shewn in Fig. 3, whereby the gaseous fumes are prevented from becoming contaminated with the liquid. Said concave cover $f$, has two or more apertures $h$, in the rim $f^1$, and two or more metal rods $i$, are secured transversely to the rim $f^1$, for supporting a secondary receptacle required to be heated as herein set forth, and when it is not required to heat a further receptacle the cover $f$, is enclosed with a lid $j$, with a small bead to allow the fumes to egress through the said aperture $h$, as set forth.

The parallel bars $i$, provided in the concave cover $f$, are for the purpose of supporting a secondary receptacle, should the latter be of a smaller diameter than the rim $f^1$, of the cover $f$, whereby the top of the flue $e$, will not be completely closed and will allow the heat to circulate around the base of the said secondary receptacle, and where the kettle $a$, and the like is of a small size, the aforesaid cover $f$, will not require these said bars $i$, as it will be readily seen that the secondary receptacle will rest upon the rim $f^1$, of the cover $f$.

From the foregoing description it will be seen that a further receptacle can be heated simultaneously thereby reducing the consumption of the heating element, and time required for boiling water or other liquid.

I claim:

A liquid heating vessel comprising a body portion, an upwardly concaved bottom, having a cruxiform slot therein, a vertical flue of internal size and shape corresponding to said slot, said flue being attached to the inner side of said bottom, and in register with said slot and extending above the top of said body portion; a removable inner cover, downwardly concaved and provided with a slot of such size and shape as to fit snugly over said flue, said inner cover having a horizontal flange for supporting it on the kettle body, and a vertical flange provided with heat-circulating openings, said vertical flange extending above the top of the flue and being provided with receptacle-supporting cross-pieces and an outer cover having a bead and being constructed to close the top of the inner cover.

MICHELE TOCCHIO.